United States Patent
Faruque

(10) Patent No.: US 10,583,871 B2
(45) Date of Patent: Mar. 10, 2020

(54) VEHICLE COMPONENT AND METHOD OF CONSTRUCTING

(71) Applicant: Ford Global Technologies, LLC, Dearborn, MI (US)

(72) Inventor: Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 267 days.

(21) Appl. No.: 15/372,601

(22) Filed: Dec. 8, 2016

(65) Prior Publication Data

US 2018/0162456 A1 Jun. 14, 2018

(51) Int. Cl.

| | |
|---|---|
| B62D 29/00 | (2006.01) |
| B33Y 10/00 | (2015.01) |
| B33Y 80/00 | (2015.01) |
| B22F 3/105 | (2006.01) |
| B22F 3/20 | (2006.01) |
| B22F 5/10 | (2006.01) |
| B22F 7/02 | (2006.01) |
| B62D 21/04 | (2006.01) |
| B22F 3/00 | (2006.01) |
| B62D 25/02 | (2006.01) |

(52) U.S. Cl.
CPC ............. *B62D 29/00* (2013.01); *B22F 3/008* (2013.01); *B22F 3/1055* (2013.01); *B22F 3/20* (2013.01); *B22F 5/106* (2013.01); *B22F 7/02* (2013.01); *B33Y 10/00* (2014.12); *B33Y 80/00* (2014.12); *B62D 21/04* (2013.01); *B62D 25/025* (2013.01); *B62D 29/007* (2013.01); *B62D 29/008* (2013.01); *B22F 2003/208* (2013.01); *B22F 2301/052* (2013.01); *B22F 2301/058* (2013.01); *B22F 2301/35* (2013.01); *B22F 2998/10* (2013.01); *B22F 2999/00* (2013.01)

(58) Field of Classification Search
CPC .......... B22F 7/02; B22F 5/106; B22F 3/1055; B22F 3/1118; B22F 7/04; B62D 21/04; B32B 1/08
USPC ........................................................ 29/897.2
See application file for complete search history.

(56) References Cited

U.S. PATENT DOCUMENTS

| | | | | |
|---|---|---|---|---|
| 3,682,606 | A * | 8/1972 | Anderson | B23K 20/2275 428/593 |
| 6,064,031 | A * | 5/2000 | Talwar | B22F 3/1055 219/121.64 |

(Continued)

FOREIGN PATENT DOCUMENTS

| | | |
|---|---|---|
| CN | 201016655 Y | 9/2006 |
| CN | 105416319 A | 3/2016 |

(Continued)

OTHER PUBLICATIONS

Machine Translation of DE102015211559A1 (Year: 2015).*

(Continued)

*Primary Examiner* — Jacob J Cigna
*Assistant Examiner* — Michael W Hotchkiss
(74) *Attorney, Agent, or Firm* — Vichit Chea; Bejin Bieneman PLC

(57) ABSTRACT

A method of constructing a vehicle component includes depositing a layer of a first metal, extruding a filament of a second metal onto the layer, and depositing a second layer of the first metal on the filament.

13 Claims, 8 Drawing Sheets

(56) References Cited

U.S. PATENT DOCUMENTS

| | | | |
|---|---|---|---|
| 6,251,340 B1* | 6/2001 | Tseng | B22F 3/002 156/167 |
| 6,364,902 B1* | 4/2002 | Dickenson | A61F 2/91 623/1.15 |
| 7,575,708 B2* | 8/2009 | DeGrange | B29C 41/46 264/497 |
| 9,149,988 B2 | 10/2015 | Mark et al. | |
| 10,011,089 B2* | 7/2018 | Lyons | B29C 64/135 |
| 2005/0134087 A1* | 6/2005 | Behr | B22D 19/14 296/187.01 |
| 2010/0191360 A1 | 7/2010 | Napadensky et al. | |
| 2011/0106290 A1* | 5/2011 | Hovel | B22F 3/1055 700/120 |
| 2013/0241114 A1* | 9/2013 | Ravich | B33Y 10/00 264/401 |
| 2014/0268604 A1 | 9/2014 | Wicker et al. | |
| 2014/0328964 A1* | 11/2014 | Mark | B29C 70/20 425/166 |
| 2014/0361460 A1* | 12/2014 | Mark | B29C 70/521 264/248 |
| 2015/0108677 A1* | 4/2015 | Mark | B29C 70/20 264/138 |
| 2015/0375340 A1* | 12/2015 | Cui | B23K 26/00 428/188 |
| 2016/0089719 A1* | 3/2016 | Lacy | C22C 19/07 148/555 |
| 2016/0175935 A1* | 6/2016 | Ladewig | B33Y 30/00 425/78 |
| 2016/0221611 A1 | 8/2016 | Wolf et al. | |
| 2016/0279873 A1* | 9/2016 | Fette | B29C 67/0077 |
| 2017/0050271 A1* | 2/2017 | Wendt | B33Y 10/00 |
| 2017/0129171 A1* | 5/2017 | Gardner | B29C 67/0055 |
| 2017/0297674 A1* | 10/2017 | Zahlen | B64C 1/06 |

FOREIGN PATENT DOCUMENTS

| | | | | |
|---|---|---|---|---|
| CN | 105501299 A | | 4/2016 | |
| DE | 102013205244 A1 | * | 9/2014 | ............ B22F 3/1055 |
| DE | 102015211559 A1 | * | 12/2016 | ............... B22F 3/10 |
| GB | 2519411 A | * | 4/2015 | ............ B22F 3/1055 |
| WO | WO-2013136096 A1 | * | 9/2013 | ............ B22F 3/1055 |

OTHER PUBLICATIONS

Snapshot of <http://asm.matweb.com/search/SpecificMaterial.asp?bassnum=m6061t6> Dated Oct. 30, 2015 (Year: 2015).*

Snapshot of <http://asm.matweb.com/search/SpecificMaterial.asp?bassnum=mq304a> Dated Jul. 12, 2015 (Year: 2015).*

* cited by examiner

VEHICLE COMPONENT AND METHOD OF CONSTRUCTING

BACKGROUND

Vehicle components, such as rocker panels, bumpers, and crush cans, may absorb energy during a vehicle impact. The amount of energy absorbed may be based on a material used to construct the vehicle component. The vehicle component may be constructed of a single material, the material having a specific set of impact absorption characteristics and weight constraints. For example, a material with a higher elastic modulus may have a higher density.

Methods of constructing the vehicle component may use one metal to form the vehicle component. For example, to weld one or more parts of the vehicle component, the parts to be welded may be constructed of the same material to ensure that the parts have similar melting temperatures. Thus, the vehicle component may have specific impact absorption characteristics based on the single material. There remains an opportunity to design a method of constructing the vehicle component from more than one material.

DETAILED DESCRIPTION

Figure 1:
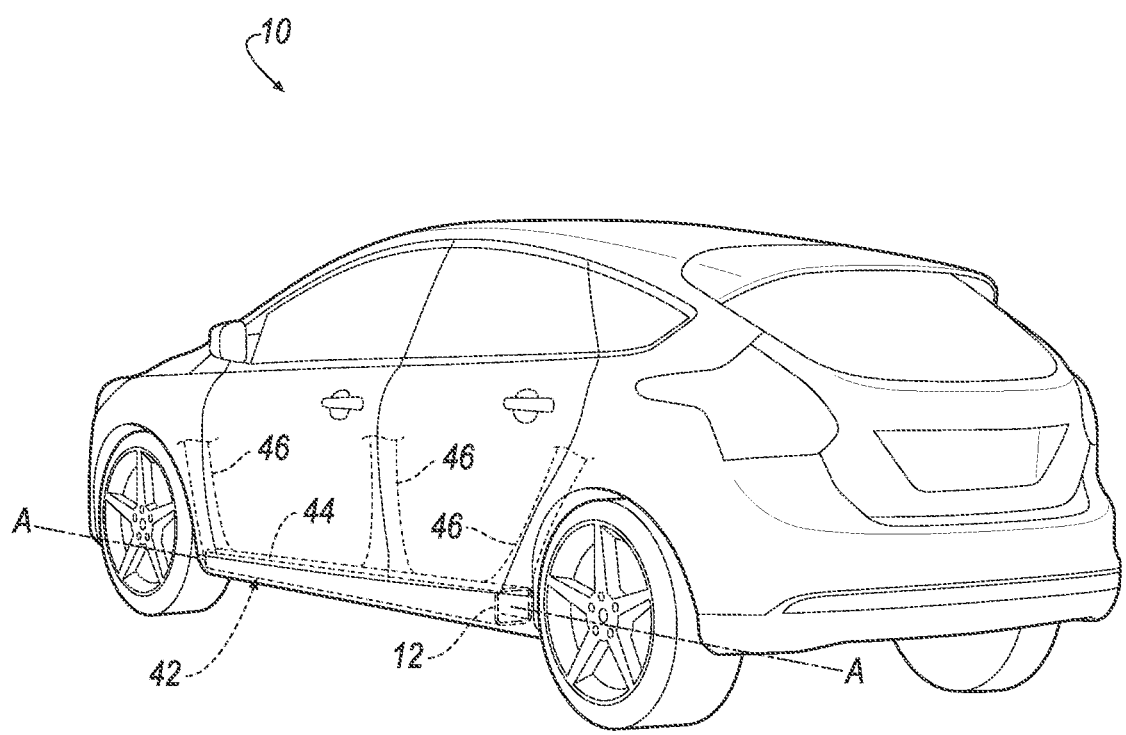
FIG. 1 is a perspective view of a vehicle including a vehicle component.

With reference to the Figures, wherein like numerals indicate like parts throughout the several views, a method of constructing a vehicle component 12, 48 includes depositing a layer 14 of a first metal, extruding a filament 16 of a second metal onto the layer 14, and depositing a second layer 14 of the first metal on the filament 16. The vehicle component 12, 48 may be a tube elongated along a longitudinal axis A and constructed of a plurality of layers 14 of the first metal and a plurality of the filaments 16 of the second metal extending longitudinally along the longitudinal axis A.

Because the vehicle component 12, 48 includes filaments 16 of the second metal between layers 14 of the first metal, the layers 14 of the first metal may transfer impact energy to the filaments 16 of the second metal, reducing deformation of the vehicle component 12, 48. The second metal may have an elastic modulus that is higher than an elastic modulus of the first metal, allowing the filaments 16 of the second metal to absorb more impact energy with less deformation than the layers 14 of the first metal. Furthermore, the first metal may have a density that is lower than a density of the second metal, reducing the overall weight of the vehicle component 12, 48. Thus, when the vehicle component 12, 48 is installed in a vehicle 10, the vehicle component 12, 48 may absorb more energy from a vehicle impact, reducing the impact energy transferred to components of the vehicle 10. Furthermore, by constructing the vehicle component 12, 48 by depositing the layer 14 of the first metal, extruding the filament 16 of the second metal onto the layer 14, and depositing the second layer 14 of the first metal on the filament 16, the vehicle component 12, 48 may be a unitary construction, further reducing deformation of the vehicle component 12, 48 during the vehicle impact.

Figure 2:
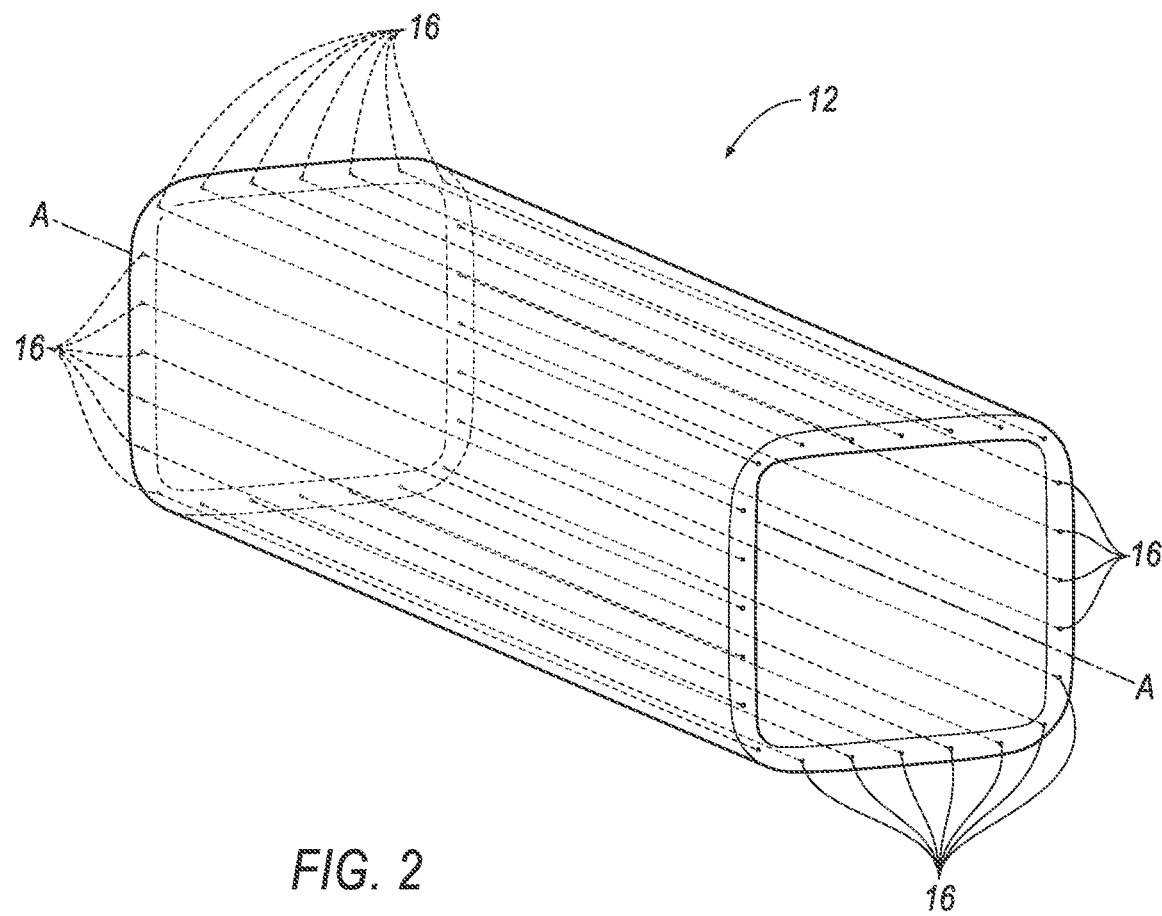
FIG. 2 is a perspective view of the vehicle component.
Figure 11:
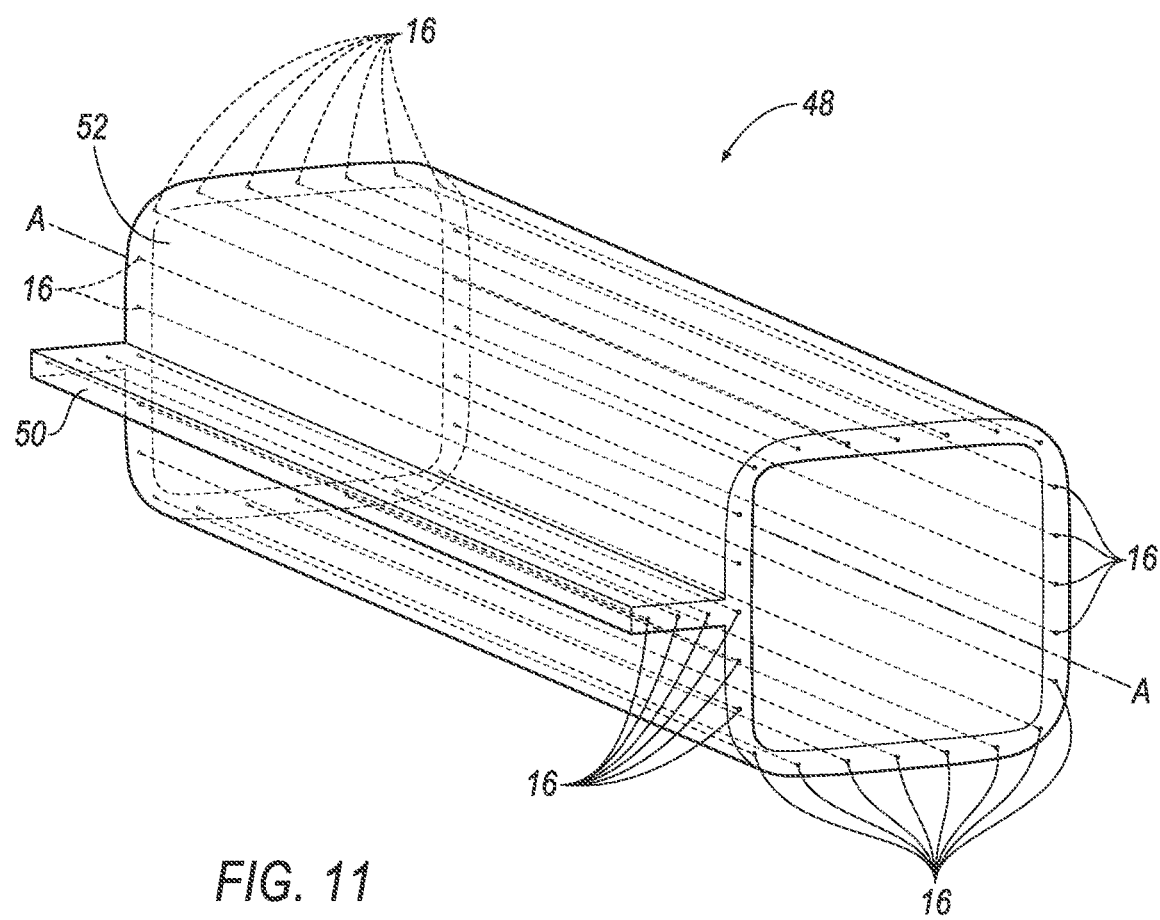
FIG. 11 is a view of a second embodiment of the vehicle component including a flange.

The vehicle component 12, as shown in FIG. 1, may be attached to the vehicle 10. While not shown in FIG. 1, the vehicle component 48 as shown in FIG. 11 may be attached to the vehicle 10. The vehicle component 12, 48 may be a tube elongated along a longitudinal axis A, as shown in FIGS. 1-2. By elongating the vehicle component 12, 48 along the longitudinal axis A, the vehicle component 12, 48 may absorb energy from impacts transverse to the longitudinal axis A, e.g., a side impact.

The vehicle component 12 may be, for example, a component of a frame 42 of the vehicle 10, such as a rocker panel 44 of the frame 42, as shown in FIG. 1. While not shown in FIG. 1, the vehicle component 48 as shown in FIG. 11 may be a component of the frame 42 of the vehicle 10. The rocker panel 44 is elongated along a lower end of the frame 42, i.e., below doors of the vehicle 10. The frame 42 may include pillars 46 connected to the rocker panel. The pillars 46 may integral with the rocker panel 44, i.e., formed together simultaneously as a single unit, or may be formed separately and subsequently attached to the rocker panel 44. The rocker panel 44 may have a uniform tubular shape, as shown in FIG. 1, or may include recesses, extensions, etc., for engaging the rest of the frame 42. As other examples, the vehicle component 12, 48 may be a bumper, a crush can, etc.

The vehicle component 12, 48 may be constructed of a first metal and a second metal. The vehicle component 12, 48 may include the plurality of layers 14 of the first metal and the plurality of filaments 16 of the second metal disposed between the layers 14. The filaments 16 may extend longitudinally along the longitudinal axis A. The filaments 16 may absorb energy from an impact applied to the vehicle component 12, 48, e.g., a side impact. That is, the filaments 16 may increase the rigidity of the vehicle component 12, 48, i.e., increase amount of energy absorbed by the vehicle component 12, 48 before the vehicle component 12, 48 deforms.

An elastic modulus of the first metal may differ from an elastic modulus of the second metal. Specifically, the elastic modulus of the second metal may be higher than the elastic modulus of the first metal. Thus, the filament 16 of the second metal can absorb more impact energy before deforming, and the vehicle component can absorb more total impact energy. By extruding the filaments 16 of the second metal between the layers 14 of the first metal, the filaments 16 absorb energy during an impact, reducing the energy absorbed by the layers 14 of the first metal. For example, the first metal may be aluminum, with an elastic modulus of 69 gigapascals (GPa), or magnesium, with an elastic modulus of 45 GPa. The second metal may be stainless steel with an elastic modulus of 200 GPa.

A density of the first metal may differ from a density of the second metal. Specifically, the density of the first metal may be lower than the density of the second metal. Because the amount of the first metal may be greater than the amount of the second metal in the vehicle component 12, 48, the overall weight of the vehicle component 12, 48 can be reduced while maintaining the desired energy absorption characteristics. For example, the first metal may be aluminum, with a density of 2700 kg/cubic meter, or magnesium, with a density of 1800 kg/cubic meter. The second metal may be stainless steel with a density of 8000 kg/cubic meter. The first metal and the second metal may be selected such that the weight of the filaments 16 of the second metal may be about 10% of the total weight of the vehicle component 12, 48.

Figure 4:
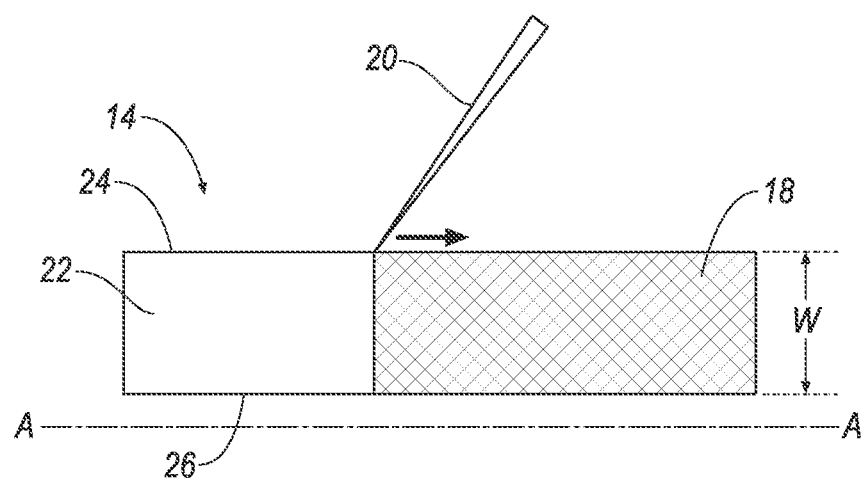
FIG. 4 is a view of formation of a layer of a first metal of the vehicle component.
Figure 5:
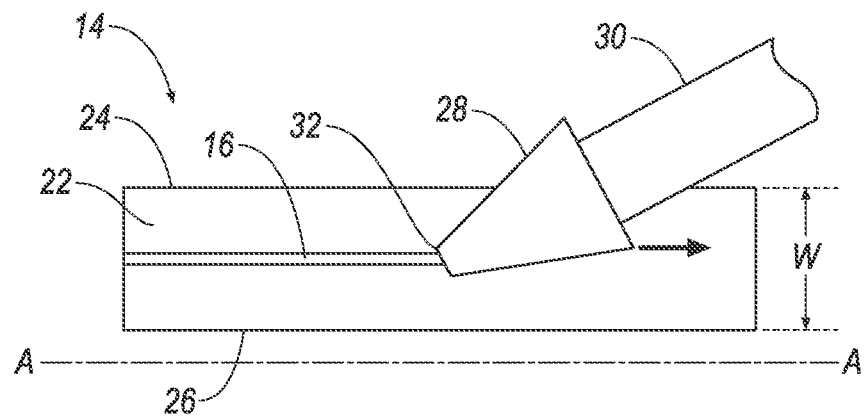
FIG. 5 is a view of extrusion of a filament of a second metal onto the layer of the first metal.
Figure 6:
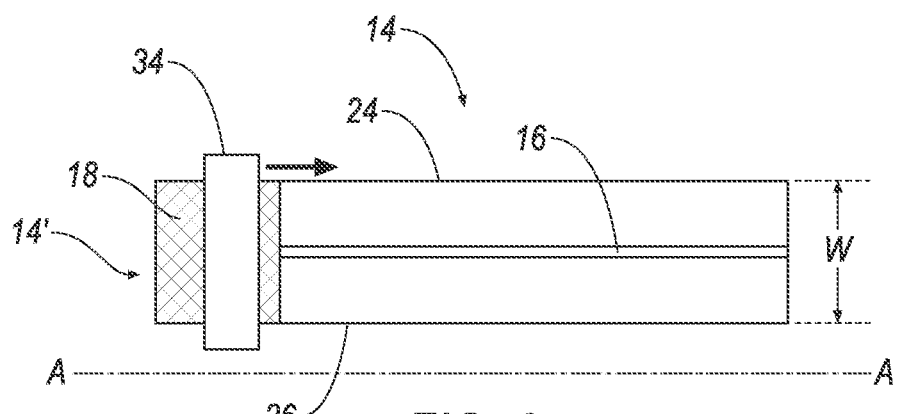
FIG. 6 is a view of depositing of a second layer of the first metal onto the layer of the first metal and the filament of the second metal.

The vehicle component 12, 48 may be constructed with an additive process, e.g., three-dimensional printing. For example, the additive process may be selective laser sintering, as shown in FIGS. 4-6, or another process where materials are selectively layered to form the vehicle component 12, 48, e.g., stereolithography, digital light processing, fused deposition modeling, selective laser melting, electronic beam melting, etc. The additive process may be performed by a three-dimensional printer (not shown). The three-dimensional printer may include a laser 20, a nozzle 28, a roller 34, and stores of the first and second metals.

The additive process starts by depositing the layer 14 of the first metal as a powder 18, as shown in FIG. 6. Upon depositing the powder 18, the laser 20, e.g., a carbon dioxide laser, may be actuated to sinter the deposited powder 18, as shown in FIG. 4. That is, the laser 20 fuses the powder 18 into a solid mass. The sintered powder 18 produces a unitary layer 14 that presents a surface 22. The layer 14 may have a first longitudinal edge 24 and a second longitudinal edge 26. The layer 14 may have a width W of about 2.0-3.0 millimeters (mm).

The nozzle 28 may then be heated and a feed 30 of the second metal may be fed through an opening 32 of the nozzle 28, as shown in FIG. 5. The feed 30 softens and forms a filament 16 that the nozzle 28 deposits onto the layer 14 of the first metal. The opening 32 of the nozzle 28 may have a substantially circular cross-section, and thus the filament 16 may have a substantially circular cross-section. The filament 16 may be extruded from the nozzle 28 along the longitudinal axis A. The filament 16, having a substantially circular cross-section, may have a diameter of about 0.1-0.2 mm.

Figure 7:
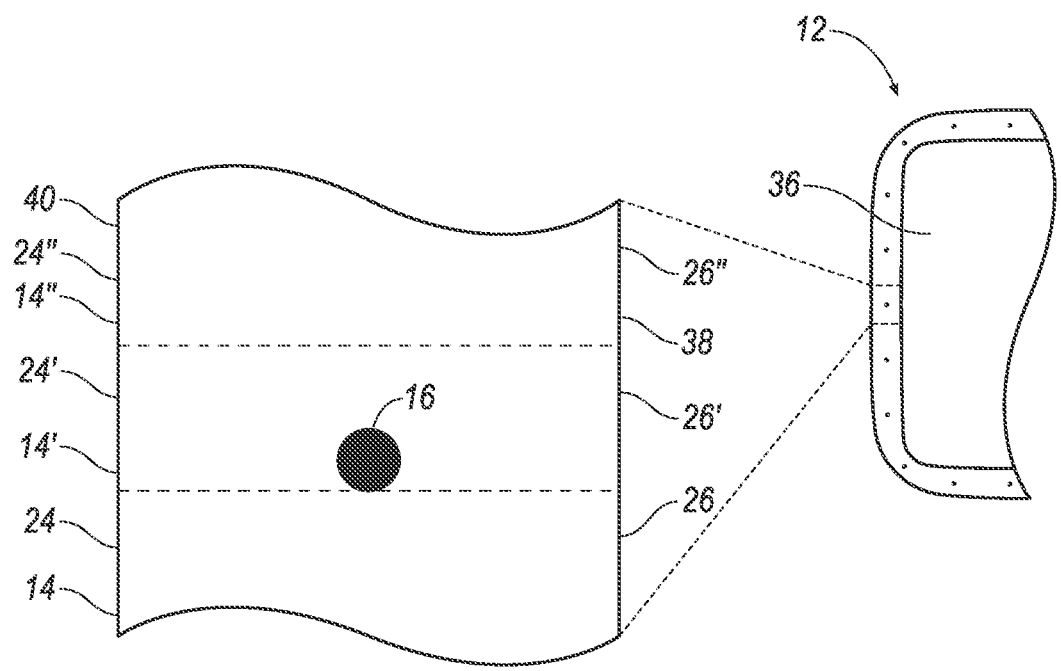
FIG. 7 is a cross-sectional view of a portion of one example of the vehicle component.
Figure 8:
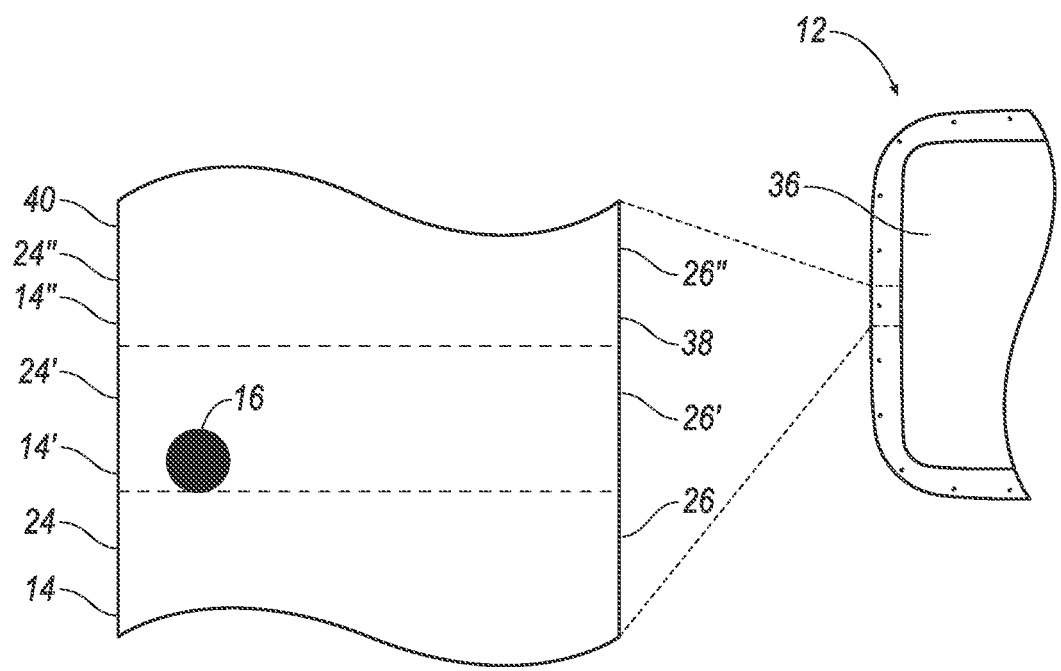
FIG. 8 is a cross-sectional view of a portion of another example of the vehicle component with the filament closer to an outer surface of the vehicle component than an inner surface of the vehicle component.
Figure 9:
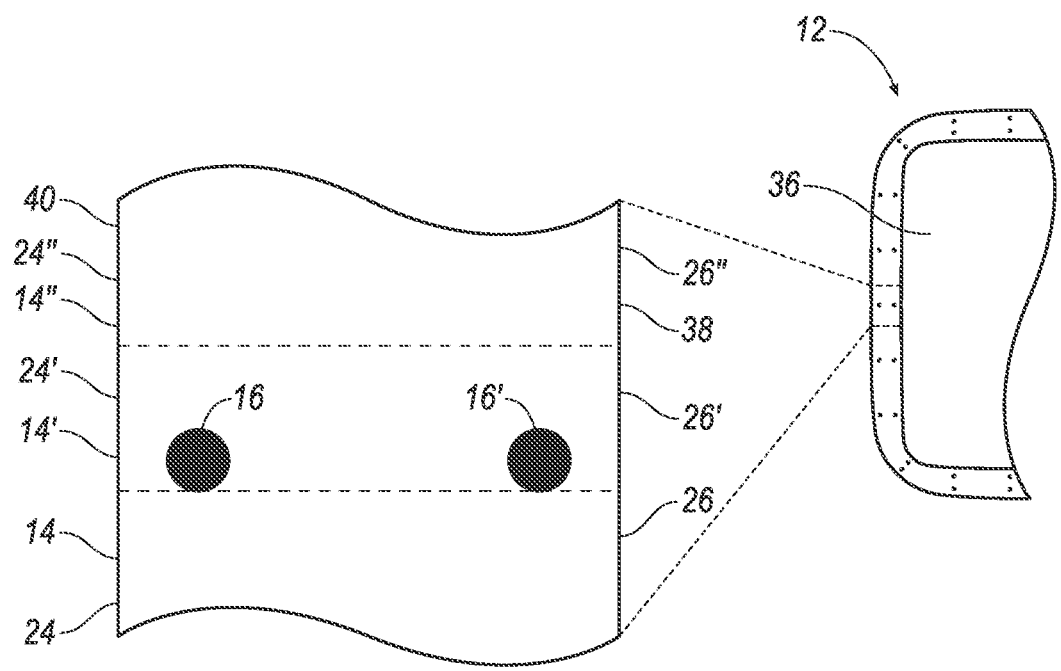
FIG. 9 is a cross sectional view of a portion of another example of the vehicle component with two filaments disposed on one layer.
Figure 10:
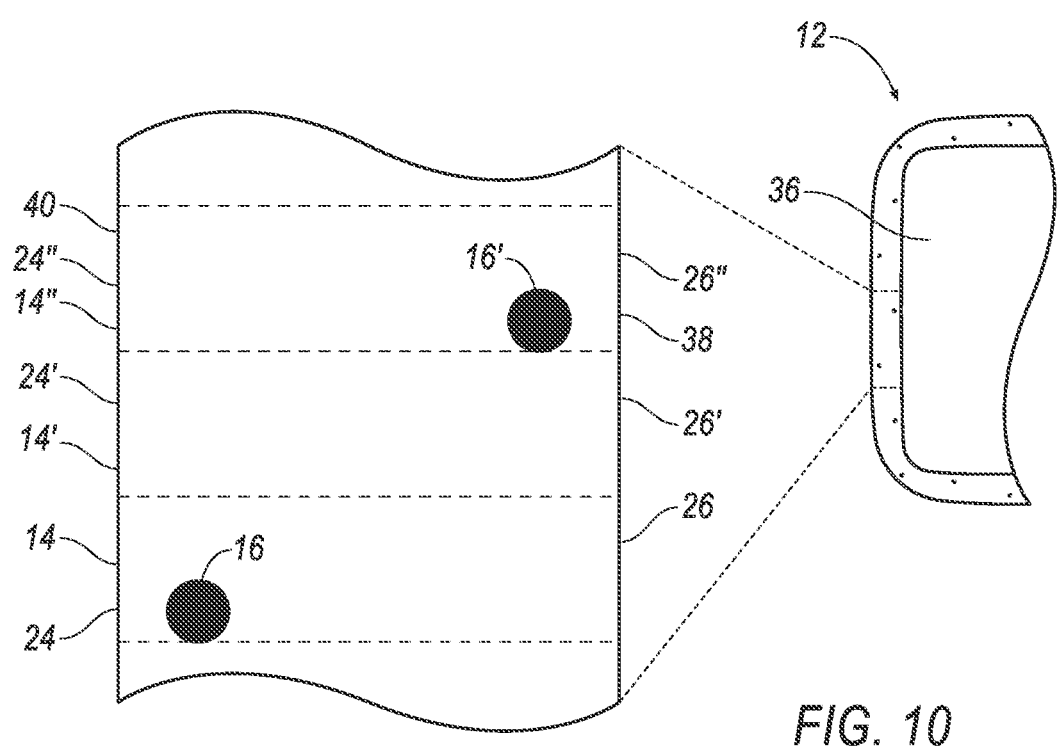
FIG. 10 is a cross-sectional view of a portion of another example of the vehicle component with the filament and a second filament disposed on different layers of the first metal.

A second layer 14' of the first metal may be deposited on the layer 14 and the filament 16, as shown in FIG. 9. As described above, the second layer 14' may be deposited as a powder 18 with the roller 34, as shown in FIG. 6. The powder 18 may be sintered with the laser 20. By depositing the second layer 14' of the first metal as a powder 18, the powder 18 surrounds a surface area of the filament 16. Thus, the layer 14 and the second layer 14' of the first metal extend around the surface area of the filament 16, as shown in FIGS. 7-9. As shown in FIG. 10, the second layer 14' and the third layer 14'' extend around the surface area of the second filament 16''.

Figure 3:
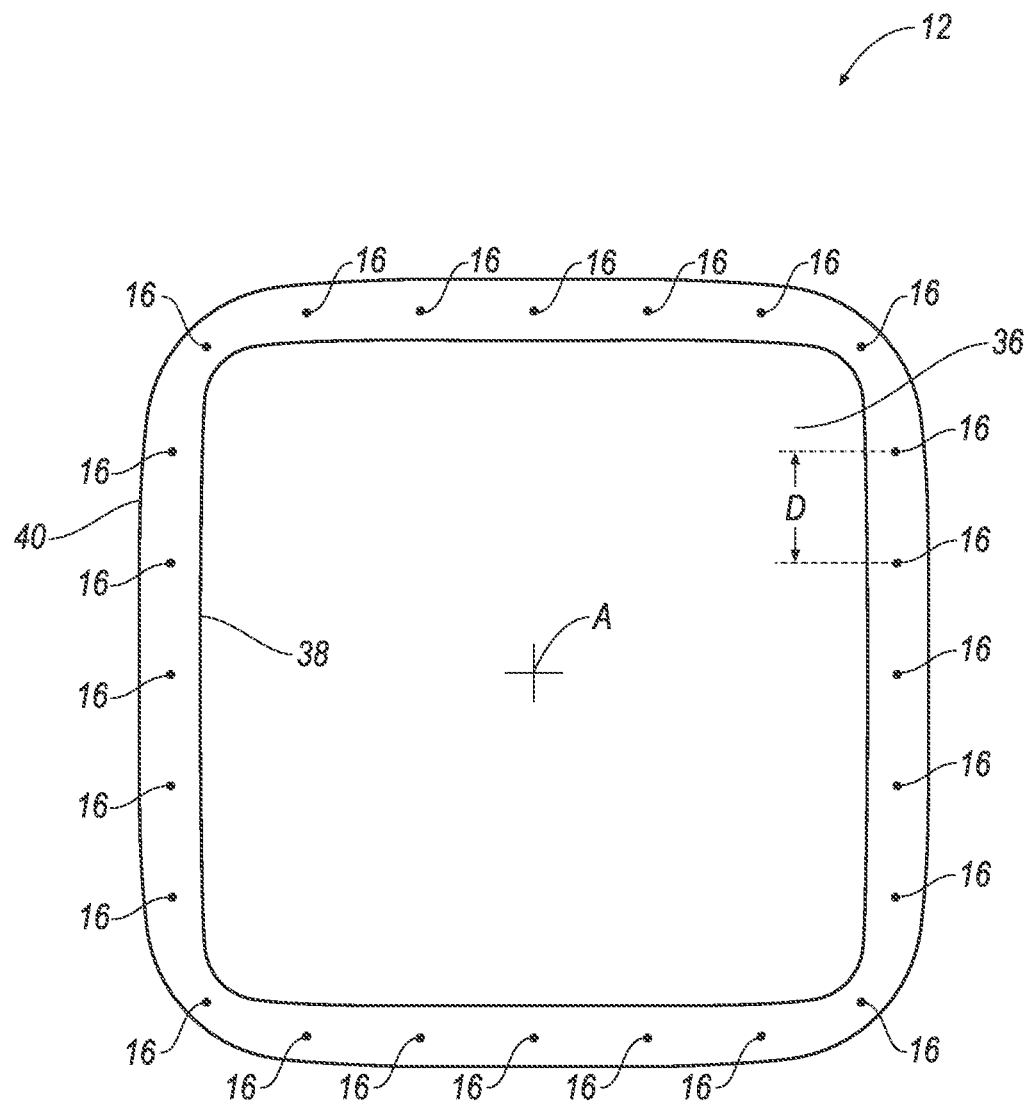
FIG. 3 is a front view of the vehicle component.

By extending around the surface area of the filament 16, the filament 16 is surrounded by the first metal, allowing the layer of the first metal to distribute impact energy to the filaments 16. A second filament 16' of the second metal, as shown in FIG. 9, may be extruded on the second layer 14' of the first metal. A third layer 14'' of the first metal, as shown in FIGS. 7-10, may be deposited on the second filament 16', as shown in FIG. 9. As shown in FIGS. 7-10, the layers 14, 14', 14'' of the first metal and the filaments 16, 16' of the second metal may be added until the vehicle component 12 is formed. A distance D between two of the filaments 16, as shown in FIG. 3, may be 2.0-3.0 mm.

As shown in FIGS. 7-10, the second layer 14' may have a respective first longitudinal edge 24' and a second longitudinal edge 26', and the third layer 14'' may have a first longitudinal edge 24'' and a second longitudinal edge 26''. That is, FIGS. 7-10 show three layers 14, 14', 14'' each having the respective first longitudinal edges 24, 24', 24'' and the second longitudinal edges 26, 26', 26''. The filament 16 and the second filament 16' may be extruded closer to one of the first longitudinal edges 24, 24', 24'' and the second longitudinal edges 26, 26', 26'' to customize the impact energy absorption characteristics of the vehicle component 12.

As shown in FIGS. 8-10, the filament 16 may be extruded closer to the first longitudinal edge 24 than the second longitudinal edge 26. Furthermore, as shown in FIG. 9, the filament 16 may be extruded closer to the second longitudinal edge 26 than the first longitudinal edge 24. As described below, based on the position of the first longitudinal edge 24 and the second longitudinal edge 26 relative to the direction of the vehicle impact, extruding the filaments 16 closer to the vehicle impact may result in more energy absorption by the filaments 16 and less deformation of the vehicle component 12.

A plurality of layers 14 of the first metal may be deposited to form the elongated tube, as shown in FIGS. 1-3 and 7-10. The tube may define a cavity 36 elongated along the longitudinal axis A. The tube may have an inner surface 38 facing the cavity 36 and an outer surface 40. By forming the vehicle component 12 as a tube, the overall weight of the vehicle component 12 may be reduced.

As shown in FIG. 10, the filaments 16, 16' may be extruded in an alternating pattern relative to the inner surface 38 and the outer surface 40. For example, FIG. 10 shows the filament 16 extruded closer to the outer surface 40 and the filament 16' extruded closer to the inner surface 38. By extruding the filaments 16, 16' in an alternating pattern, the impact energy absorption characteristics of the vehicle component 12 may be customized. Furthermore, the filaments 16 may be extruded in a different pattern on the layers 14 to produce specific impact energy absorption characteristics of the vehicle component 12.

The vehicle component 12, 48 may be a unitary construction. That is, the vehicle component 12, 48 may be formed with the additive process described above and shown in FIGS. 4-6 into a single piece. Because the vehicle component 12, 48 is formed in a unitary construction, the vehicle component 12, 48 may lack seams that reduce the strength of the vehicle component 12, 48. The unitary construction of the vehicle component 12, 48 may distribute the impact energy more evenly, reducing the deformation of the vehicle component 12, 48.

As described above and shown in FIGS. 4-10, the layer 14 of the first metal may have the first longitudinal edge 24 and the second longitudinal edge 26. The first longitudinal edge 24 may present part of the outer surface 40 of the vehicle component 12, as shown in FIGS. 7-10. The second longitudinal edge 26 may present part of the inner surface 38 of the vehicle component 12, as shown in FIGS. 7-10. That is, based on where the layer 14 is deposited, the first and second longitudinal edges 24, 26 may present part of one of the inner surface 38 and the outer surface 40. That is, while FIGS. 7-10 show the first longitudinal edge 24 presenting part of the outer surface 40, on an opposite side of the vehicle component 12 (not shown in FIGS. 7-10) the first longitudinal edge 24 may present part of the inner surface 38.

The filament 16 of the second metal may be extruded closer to the first longitudinal edge 24 than the second longitudinal edge 26, as shown in FIGS. 8-10. That is, the filament 16 may be disposed closer to the outer surface 40 than the inner surface 38, as shown in FIGS. 8-10. When the filament 16 is disposed closer to the outer surface 40 than the inner surface 38, impact energy may be absorbed by the filament 16 more quickly, reducing deformation of the vehicle component 12. That is, the impact may contact the outer surface 40 first, and the impact energy may travel through the layer 14 of the first metal until reaching the filament 16 of the second metal. There, at least a portion of the impact energy is absorbed by the filament 16. When the filament 16 is closer to the outer surface 40 than the inner surface 38, the layers 14 of the first metal absorbs less impact energy before the impact energy reaches the filament 16, allowing the filament 16 to absorb more impact energy and reduce deformation of the vehicle component 12.

More than one filament 16 of the second metal may be extruded on each layer 14 of the first metal, as shown in FIG. 9. For example, after extruding the filament 16 of the second metal onto the layer 14 of the first metal, a second filament 16' of the second metal may be extruded on the layer 14 of the first metal. By extruding more than one filament 16 of the second metal on the layer 14 of the first metal, the vehicle component 12 may have more filaments 16 of the second metal and can absorb more impact energy. The filaments 16 of the second metal may be deposited in an elongated pattern on each of the plurality of layers 14 of the first metal.

While the component 12 is shown in FIGS. 1-10 as a rectangular tube, the component 12 may have a different shape. For example, as shown in FIG. 11, a second embodiment of a vehicle component 48 may be a rectangular tube with a flange 50 extending from an outer surface 52 of the rectangular tube. The flange 50 may be used to attach to a part of the vehicle body, e.g., the pillars 46. The flange 50 may be constructed by depositing the plurality of layers 14 of the first metal and extruding the one or more filaments 16 onto the layers 14, as described above. For example, as shown in FIG. 11, the flange 50 may include a plurality of filaments 16 that absorb impact energy. The flange 50 may be formed as a unitary construction with the other parts of the vehicle component 48, as described above. The flange 50 may be a single piece, as shown in FIG. 11, or may be a plurality of pieces formed on the outer surface 52 to align with each one of the pillars 46. Furthermore, the vehicle component 48 may have a plurality of flanges 50 (not shown in FIG. 11) formed with the additive process described above.

Figure 12:
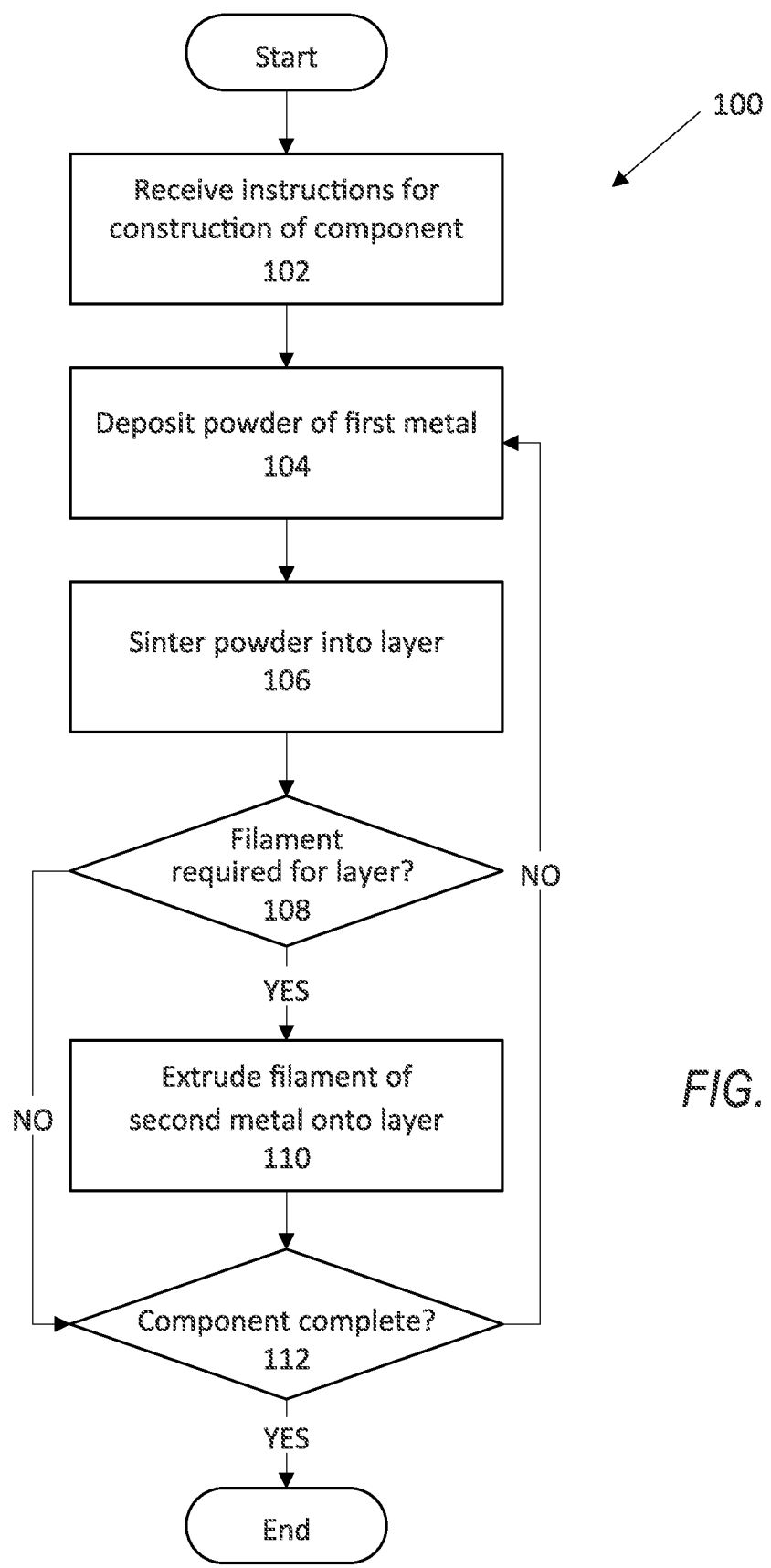
FIG. 12 is a block diagram of a process for constructing the vehicle component.

FIG. 12 illustrates a process 100 for constructing the vehicle component 12, 48. The process 100 begins in a block 102, in which the three-dimensional printer receives instructions for construction of the vehicle component 12, 48. The instructions may include, e.g., a number of the layers 14 to deposit, a number of filaments 16 to extrude onto the layers 14, specific layers 14 onto which to extrude the filaments 16, etc.

In a block 104, the powder 18 of the first metal is deposited by the roller 34, as shown in FIG. 6. The roller 34 can deposit the powder 18 onto, e.g., another layer 14, one of the filaments 16, unsintered powder 18, etc.

In a block 106, the laser 20 sinters the powder 18 into the layer 14. As described above and shown in FIG. 5, the laser 20 fuses the powder 18 into a solid mass that presents the surface 22. By sintering the powder 18, the laser 20 fuses the current layer 14 with the previous layer 14, forming the unitary construction of the vehicle component 12.

In a block 108, the three-dimensional printer determines whether the instructions indicate that one of the filaments 16 should be extruded onto the layer 14. If the instructions indicate that one of the filaments 16 should be extruded onto the layer 14, the process 100 continues in a block 110. Otherwise, the process 100 continues in a block 112.

In the block 110, the nozzle 28 heats the feed 30 of the second metal and extrudes the filament 16 onto the surface 22 of the layer 14. The heated nozzle 28 softens the feed 30, allowing the nozzle 28 to push the feed 30 through the opening 32 and extrude the filament 16. As described above and shown in FIG. 5, the nozzle 28 may extrude the filament 16 along the longitudinal axis A on the layer 14.

In the block 112, the three-dimensional printer determines whether the vehicle component 12, 48 is complete. That is, the three-dimensional printer determines whether more of the layers 14 still need to be added to construct the vehicle component 12, 48. If all of the layers 14 of the vehicle component 12, 48 have been laid, the vehicle component 12, 48 is complete and the process 100 ends. Otherwise, the process 100 returns to the block 104 to actuate the roller 34 to deposit more of the powder 18 of the first metal.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of constructing a vehicle component, comprising: depositing a first layer of a first metal; laser sintering the first layer of the first metal; extruding a filament of a second metal onto a surface of the sintered layer; depositing a second layer of the first metal on the filament; and depositing a plurality of layers of the first metal and a plurality of filaments of the second metal to form a tube elongated along an axis, the tube defining a cavity elongated along the axis, wherein at least one of the filaments of the plurality of filaments is elongated along the axis; wherein each filament of the plurality of filaments is the sole filament disposed on the respective layer of the first metal; wherein the tube has an inner surface facing the cavity and an outer surface, and at least one filament of the plurality of filaments is disposed closer to the outer surface than the inner surface and at least one filament of the plurality of filaments is disposed closer to the inner surface than the outer surface.

2. The method of claim 1, wherein an elastic modulus of the second metal is higher than an elastic modulus of the first metal.

3. The method of claim 1, wherein a density of the first metal is lower than a density of the second metal.

4. The method of claim 1, wherein the first metal is one of aluminum and magnesium.

5. The method of claim 1, wherein the second metal is stainless steel.

6. The method of claim 1, further comprising extruding each filament of the plurality of filaments by heating a nozzle and feeding a feed of the second metal through the nozzle.

7. The method of claim 1, wherein each filament of the plurality of filaments has a substantially circular cross-section.

8. The method of claim 1, wherein the first layer and the second layer of the first metal extend around a surface area of the sole filament.

9. The method of claim 1, further comprising extruding a second filament of the second metal on the second layer of the first metal and depositing a third layer of the first metal on the second filament.

10. The method of claim 1, further comprising extruding each filament of the plurality of filaments along a longitudinal axis.

11. The method of claim 1, wherein the tube is a unitary construction.

12. The method of claim 1, further comprising, for each layer of the first metal, depositing the first metal as a powder and laser sintering the deposited powder.

13. The method of claim 1, further comprising depositing the plurality of layers of the first metal to form a flange extending from the tube.

* * * * *